United States Patent [19]
Baker et al.

[11] Patent Number: 5,696,416
[45] Date of Patent: *Dec. 9, 1997

[54] MOUNTING OF MOTOR FOR REFRIGERATION

[75] Inventors: Gerald N. Baker; Alan D. Crapo, both of Florissant, Mo.

[73] Assignee: Emerson Electric Co., St. Louis, Mo.

[*] Notice: The term of this patent shall not extend beyond the expiration date of Pat. No. 5,532,534.

[21] Appl. No.: 292,847

[22] Filed: Aug. 19, 1994

[51] Int. Cl.⁶ ............................. H02K 5/00; H02K 5/22; H02K 5/04
[52] U.S. Cl. ..................... 310/91; 310/89; 310/68 R; 310/71
[58] Field of Search ........................ 310/89, 91, 88, 310/85, 71; 439/926; 174/50; 361/825; 248/670, 672, 674

[56] References Cited

U.S. PATENT DOCUMENTS

| | | | |
|---|---|---|---|
| 3,787,014 | 1/1974 | Story et al. | 310/91 |
| 4,614,886 | 9/1986 | Schneider et al. | 310/89 |
| 4,649,230 | 3/1987 | Nielsen | 74/65 R |
| 4,657,478 | 4/1987 | Lazebnik et al. | 248/674 |
| 4,920,696 | 5/1990 | Mawby et al. | 248/674 |
| 4,978,876 | 12/1990 | Koster | 310/89 |
| 5,332,188 | 7/1994 | Davis et al. | 248/674 |
| 5,524,860 | 6/1996 | Ives | 248/674 |
| 5,532,534 | 7/1996 | Baker et al. | 310/89 |

FOREIGN PATENT DOCUMENTS

| | | | |
|---|---|---|---|
| 405002 | 1/1991 | European Pat. Off. | 310/89 |
| 565312 | 10/1993 | European Pat. Off. | 310/47 |
| 1302317 | 7/1962 | France | 310/71 |
| 2829945 | 1/1980 | Germany | 310/156 |
| 3625109 | 2/1988 | Germany | 310/71 |
| 55-13645 | 1/1980 | Japan | 310/89 |
| 63-39437 | 2/1988 | Japan | 310/71 |
| 63-198549 | 8/1988 | Japan | 310/71 |

Primary Examiner—Thomas M. Dougherty
Assistant Examiner—B. Mullin
Attorney, Agent, or Firm—Polster, Lieder, Woodruff & Lucchesi

[57] ABSTRACT

In a refrigerator motor with a hollow base-housing with an open mouth defined by a side wall, and a cover for the mouth, one of the housing and cover has integral with it at the mouth, one deflectable finger, one end of which is integral with one of said cover and housing and a free end of which is provided with a lip. The other of the housing and cover has integral with it a complementary ledge, spaced and shaped to receive and to be engaged by the lip. In either case, the cover carries, preferably integral with it, a motor mounting bracket by which the motor is mounted in a refrigeration unit. In a preferred embodiment, the finger is integral with the cover and the ledge is integral with the housing, and the mounting bracket has arms that extend beyond a lower perimeter of the housing.

15 Claims, 4 Drawing Sheets

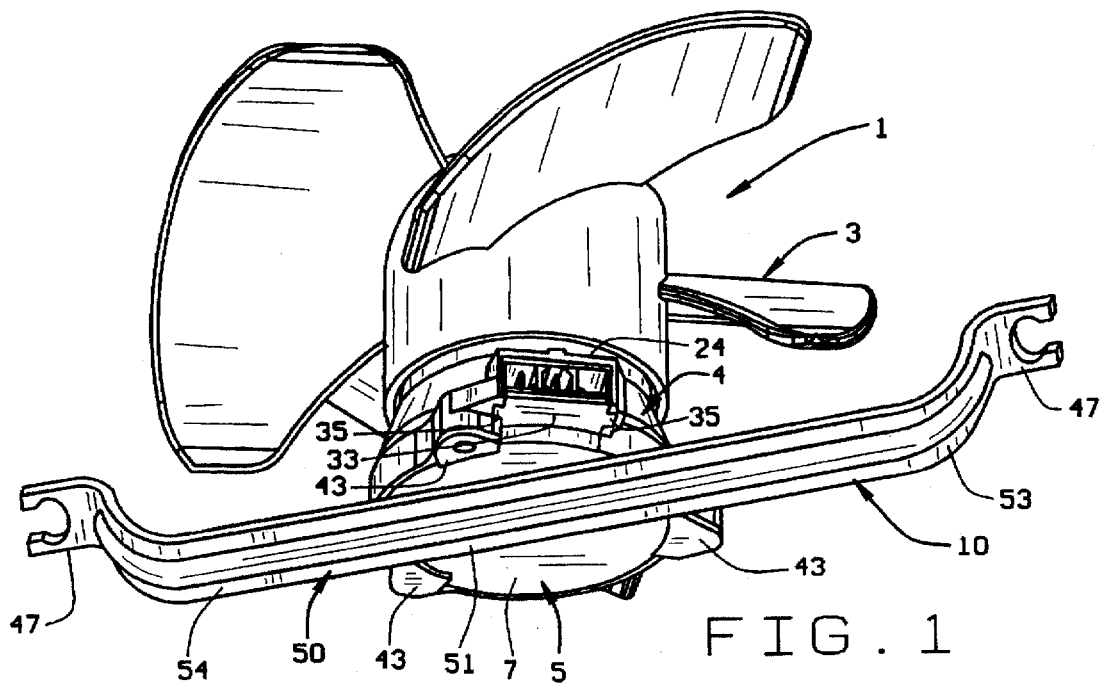
FIG. 1
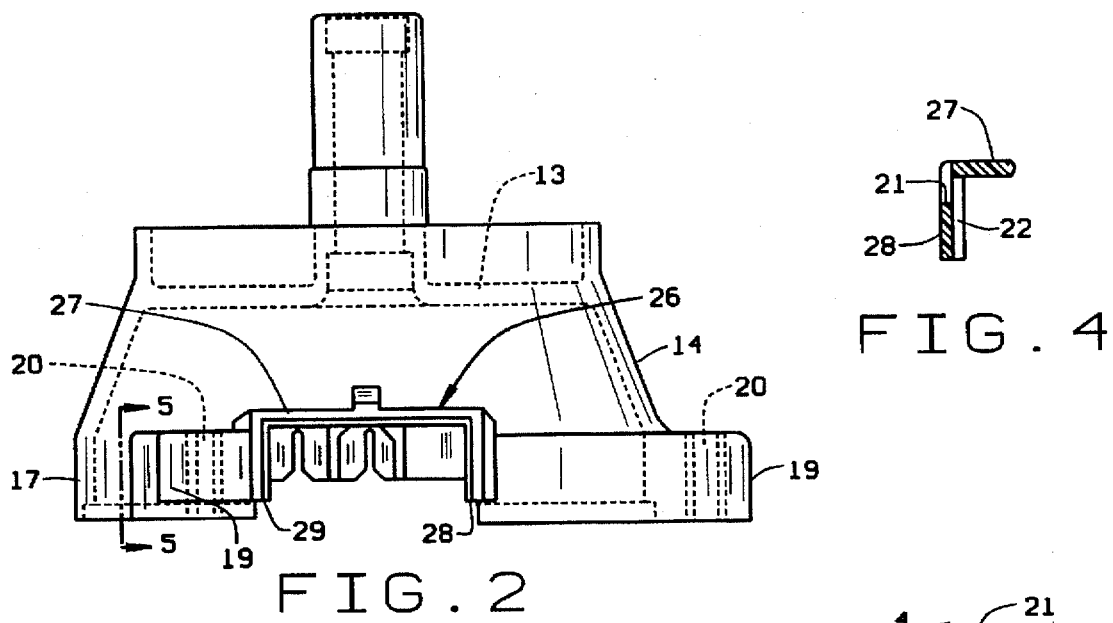
FIG. 2
FIG. 4
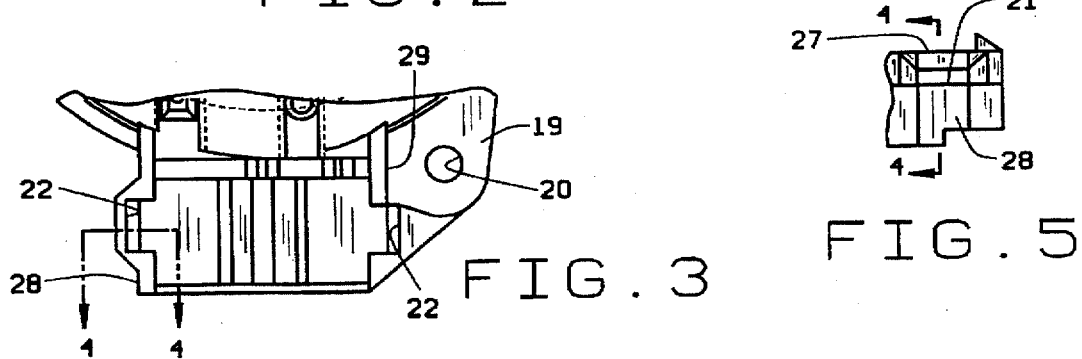
FIG. 3
FIG. 5

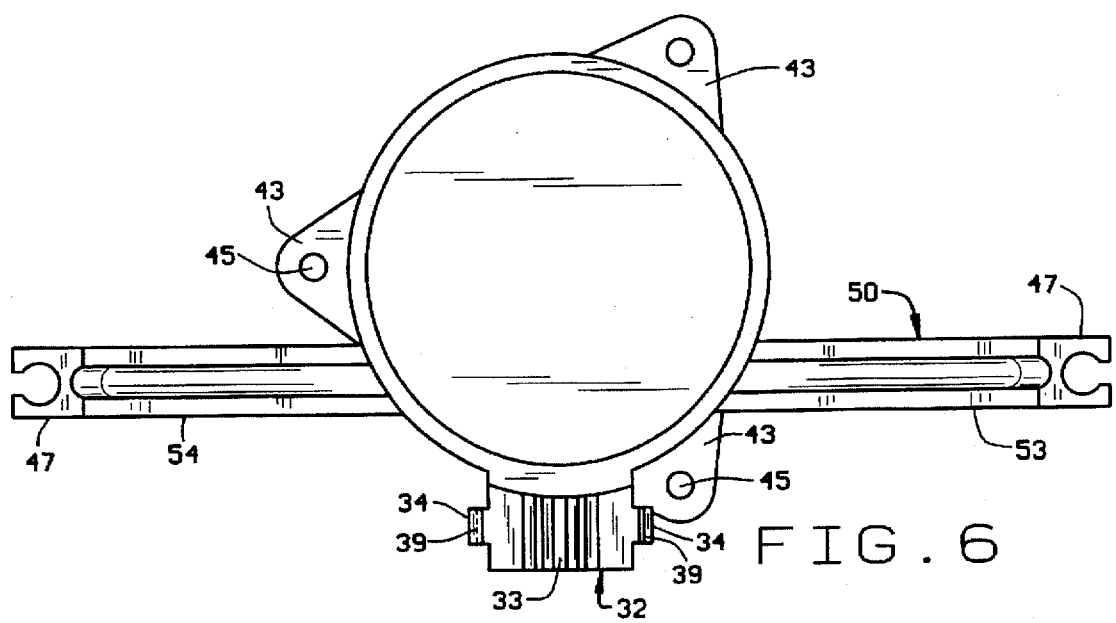
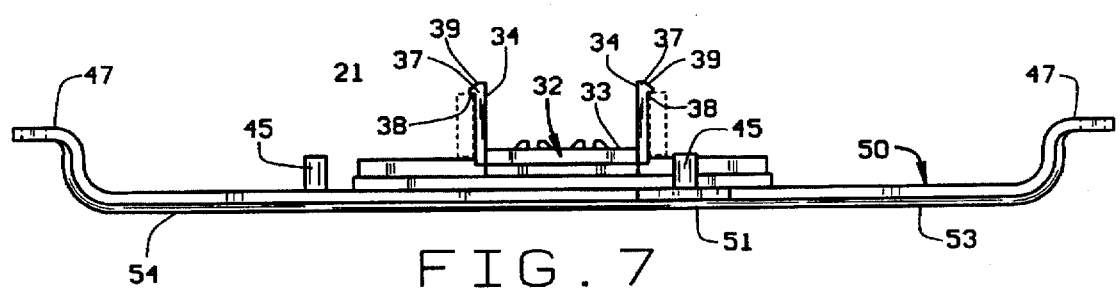
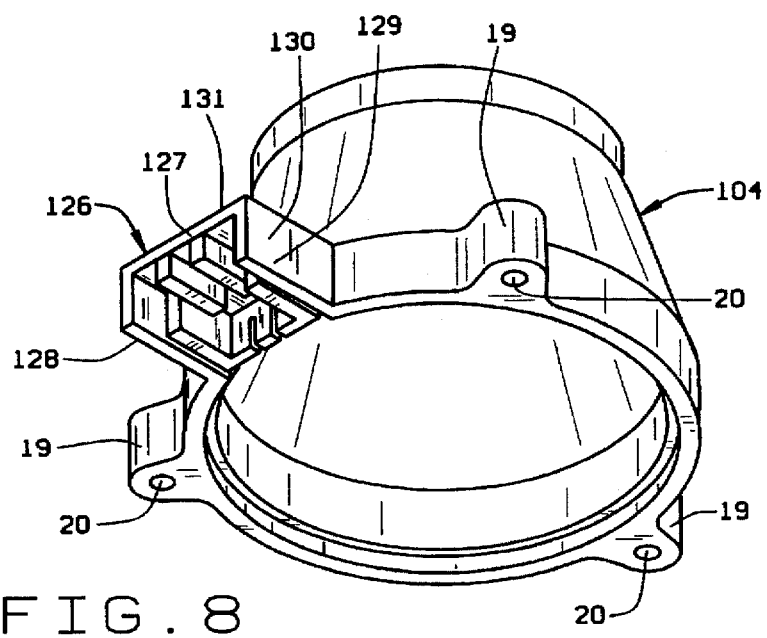

MOUNTING OF MOTOR FOR REFRIGERATION

RELATED APPLICATIONS

This application is closely related to application Ser. No. 08/240,635, filed May 11, 1994, now U.S. Pat. No. 5,616, 975 May, et al., Integral Connector and Motor Housing (DN 5493); and application Ser. No. 08/240,633, filed May 11, 1994, Baker et al., Brushless Permanent Magnet Condenser Motor for Refrigeration, now U.S. Pat. No. 5,532,534, and applications there referred to, all assigned to the assignee of the present invention, the disclosures of which applications are incorporated herein by reference.

BACKGROUND OF THE INVENTION

The problems associated with refrigerator condenser and evaporator motors and solutions, particularly as applied to condenser motors, are explained in the closely related applications identified above and will not here be repeated. In the condenser motors there described, open bottomed motor base-housings were described as being provided with mounting pads or bosses with mounting holes through them oriented parallel to the axis of rotation of the brushless permanent magnet (BPM) motors. This arrangement is quite satisfactory in those installations in which a refrigerator motor bracket has bolt holes or studs in the same pattern. When a motor made for use as a condenser motor is to be mounted to serve as an evaporator motor, however, for example, the housing bosses appropriate for the condenser motor cannot be used. To accommodate the requirements of different brackets by using housing bosses would entail a great deal of trouble and expense, and may not always be feasible. Because cost considerations are important in the appliance industry, it is desirable to provide a relatively inexpensive and effective motor mounting arrangement that is versatile as well.

One of the objects of this invention is to provide an economically producible mounting arrangement for a refrigeration fan motor.

Another object of this invention is to provide a motor design which can be incorporated into a variety of applications.

Other objects of this invention will be apparent to those skilled in the art in light of the following description and accompanying drawings.

SUMMARY OF THE INVENTION

In accordance with this invention, generally stated, a motor, in the embodiments described, a brushless permanent magnet motor, is provided with an open-bottomed, cup-shaped base-enclosure or housing, and a cover which serves as a closure for the housing, and also carries means for mounting the motor. The housing has a side wall and a top wall defining an interior space. One of the housing and cover has integral with it at least one finger, with a lip at a free end; the other of the housing and cover has at least one ledge, over which the lip extends to engage a surface of the ledge and hold the cover in place. In all of the embodiments, the fingers and ledges are so positioned that their engagement orients the mounting means properly, where such orientation is required.

In the preferred embodiment shown, in which the construction of the housing and cover are generally the same as is shown and described in Ser. No. 08/240,635 (DN 5493), the housing has a generally circular lower perimeter, from which mounting pads or bosses extend outwardly. A housing receptacle part with an open bottom and outer side projects chordally from the housing side wall, opening through the lower perimeter. The cover has two latching fingers, of a piece with the cover receptacle part, and the housing receptacle part has two ledges. The fingers are deflectable. The lip of each finger engages a surface of the ledge remote from an inner surface of the cover to complete the motor receptacle and to hold the cover in housing closing position.

In one version of the preferred embodiment, the housing receptacle part has side walls projecting chordally from the housing side wall at a lower perimeter of the side wall, a top surface and an open bottom and outer side. The cover has a complementarily shaped and proportioned receptacle part adapted to close the open bottom of the housing receptacle part. Fingers integral with the cover receptacle part are spaced to embrace the outer surfaces of the housing receptacle side walls, and the lips, which face one another, are positioned to move over and engage ledges in the housing receptacle part, which can be constituted by the top surface of the top wall itself.

In another version of the preferred embodiment, the housing receptacle side walls have inwardly facing channels, top surfaces of which constitute the ledges. The fingers are integral at one end with the cover receptacle part and are spaced a distance equal to or slightly less than the distance between the ledges, the lips projecting in the direction of the ledges and being spaced to project over the ledges when the cover is installed. In installing the cover, and completing the receptacle, the fingers are cammed away by surfaces of the lip and of a bottom wall of the channels, permitted by the deflection of the fingers, are moved up the channels, and when the lips clear the upper surface of the ledge, they spring into latching position over the ledge. After they are installed, the fingers can be deflected manually to displace the lip from ledge-engaging condition to release the fingers, hence the cover.

In another embodiment, the construction of which is substantially the same as is described in Ser. No. 08/240,633 (DN 5443), current supply conductors extend through a side wall port in the housing and are electrically connected in the interior of the housing to electrical conductors from a circuit. The housing cover has, projecting into the interior space of the housing, at least one deflectable prong or finger with an overhanging lip, and a strain relief block positioned adjacent but spaced from the side wall port. The cover has a tool-receiving aperture to permit engagement of a tool with the prong. A ledge, carried by an inner surface of the enclosure, is positioned complementarily to the finger lip to permit the lip to engage a surface of the ledge remote from an inner surface of the cover to hold the cover in position, but to permit the displacement of the finger by a tool inserted through the cover aperture to release the finger and the cover. In the illustrative embodiment, conductor wires from a circuit board mounted above the top wall of the housing are mounted in a connector block within the housing, and the lip-engaging ledge is part of the connector block.

In both embodiments, the outer edge of the side wall of the enclosure is generally circular in plan, and is stepped to provide a seat for the cover. The cover, which is generally circular in plan, has an inwardly projecting peripheral rim that is stepped complementarily to the enclosure edge step, and in the embodiments shown, ears extending outwardly from the rim. At least one of the ears supports and is integral with one end of a pin of a size to fit closely within a hole in the mounting pads or bosses of the housing, to inhibit accidental cocking of the cover with respect to the housing.

The motor mounting means in both embodiments is a bracket with arms extending outwardly from the cover and integral with the cover. The arms have fastener-receiving yokes on them arranged complementarily to mounting brackets in the refrigeration system in which the motor is employed. The virtue of this invention is that motors with one type of housing, for example the condenser motor of the related applications, can be mounted on brackets of different configurations and sizes, for example brackets for mounting evaporator motors, merely by using covers with different motor mounting brackets integral with them. The covers can be made economically, and can be separated manually from the housing to permit replacement of motors.

BRIEF DESCRIPTION OF THE DRAWINGS

In the drawings, FIG. 1 is a bottom view, in perspective, of one illustrative embodiment of motor assembly equipped with a receptacle of this invention;

FIG. 2 is a view in front elevation of the housing of the motor assembly of FIG. 1;

FIG. 3 is a fragmentary bottom plan view of a receptacle part of the housing of FIG. 2;

FIG. 4 is a sectional view taken along the lines 4—4 of FIGS. 3 and 5;

FIG. 5 is a fragmentary view in side elevation of the receptacle shown in FIG. 3;

FIG. 6 is a top plan view of a cover member of the motor assembly shown in FIG. 1;

FIG. 7 is a view in front elevation of the cover of FIG. 6;

FIG. 8 is a view in bottom perspective of the housing of another embodiment, the preferred embodiment, of motor assembly of this invention;

DESCRIPTION OF THE PREFERRED EMBODIMENT

Figure 9:
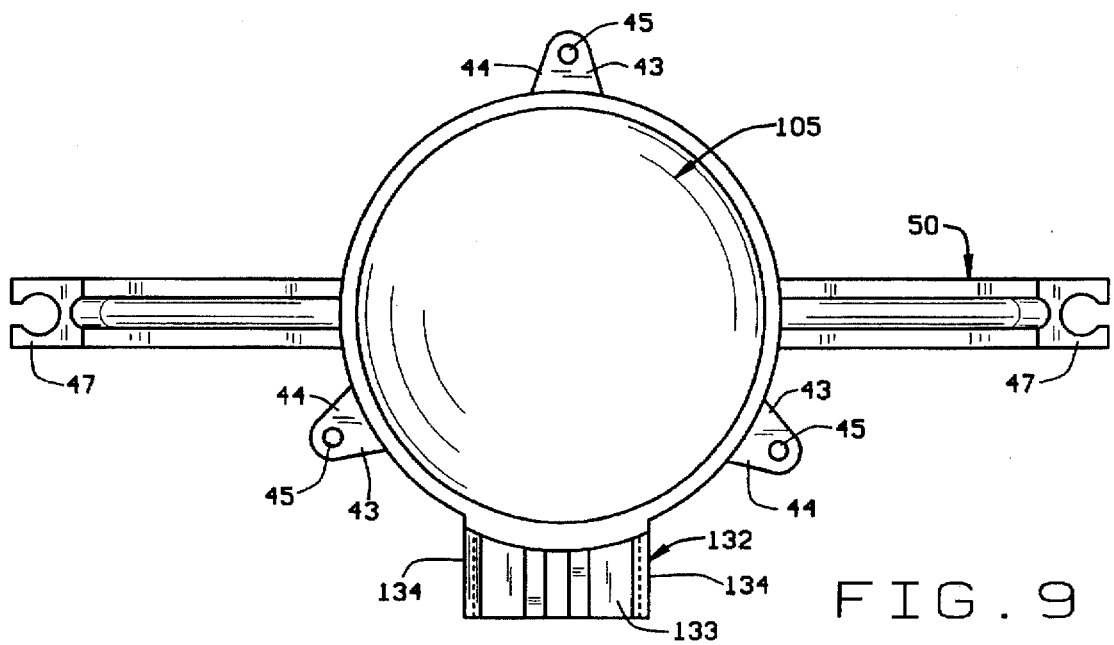
FIG. 9 is a top plan view of a cover member for use with the housing of FIG. 8.

Referring now to FIGS. 1–7, for one version of an illustrative embodiment of this invention, reference numeral 1 indicates a brushless permanent magnet motor. The motor 1 includes an integral fan blade assembly 3, which forms no part of the present invention, a housing 4, and a cover 5. The cover 5 carries motor mounting means 10. The construction of the motor 1 and housing 4 are substantially the same as that of one of the embodiments of motor described in application Ser. No. 08/240,635 (DN 5493).

The housing 4 has a top wall 13 and a side wall 14. The side wall 14 is flared radially outwardly toward its lower perimeter, and has a cylindrical rim section 17 at its lower end, which is generally circular in plan. The housing 4 also has integral with it, spaced along an outer surface of the cylindrical part or rim 17, a plurality of mounting bosses or pads 19, with fastener receiving passages 20 through them, by which the motor i is attached to a bracket when the bracket is so configured. However, as has been explained above, the refrigerator brackets on which the motors of this invention are mounted are not so configured.

As shown in FIGS. 1 through 7, the housing 4 and cover 5 cooperate to define a connector block or receptacle 24. Various features of the connector block and the electrical elements contained in it are described in the co-pending applications incorporated herein by reference.

The receptacle 24 is made in two parts, a housing receptacle part 26 and a cover receptacle part 32. The housing receptacle part 26 is made of a piece with the housing wall 14, as shown particularly in FIGS. 2 and 3. For purposes of this invention, it is made up of a top wall 27 and side walls 28 and 29. The side walls 28 and 29 are essentially mirror images of one another, although the wall 29 is shown as having a gusset on its outboard side, connected to a boss 19. Both of the side walls 28 and 29 have in their inside, facing walls, an offset section defining channels 22, extending parallel with one another height-wise of the end walls, substantially perpendicular to the top wall 27. The upper end of each channel ends with a flat surface, ledge 21.

The cover receptacle part 32 has a bottom wall 33 with ears 35 extending a short distance from opposite sides. The cover receptacle part 32 projects chordally, and is also shaped complementarily to the housing receptacle part 26, to serve as a closure for that housing receptacle part and to complete the receptacle 24. Latching fingers 34 are integral at their lower ends with the ears 35 and project upwardly, as shown particularly in FIG. 7. Each of the fingers 34 has an outwardly projecting lip 37, with an overhang surface 38, above which is an inwardly upwardly sloping cam surface 39. The fingers 34 are parallel to one another and perpendicular to the bottom wall 33. They are spaced to fit closely within the channels 22, with the overhang surfaces 38 of the lips 37 projecting over and engaging the top edge surface 21 of the channel wall. The cover 5 and the fingers 34 are made of an electrically insulative plastic material that permits the fingers to flex or deflect sufficiently to permit the lips' being cammed away from the wall defining the bottom of the channel, and to snap into space over the top edge or ledge 21.

The engagement of the surfaces 38 of the lips 37 and the ledges 21 serves to hold the entire cover in place. Because the lips extend outboardly through an open window between the top wall 27 and the ledge 21, as shown in FIGS. 4 and 5, they are readily accessible to a screwdriver blade or the like, by which they can be moved inwardly to clear the ledges.

Figure 10:
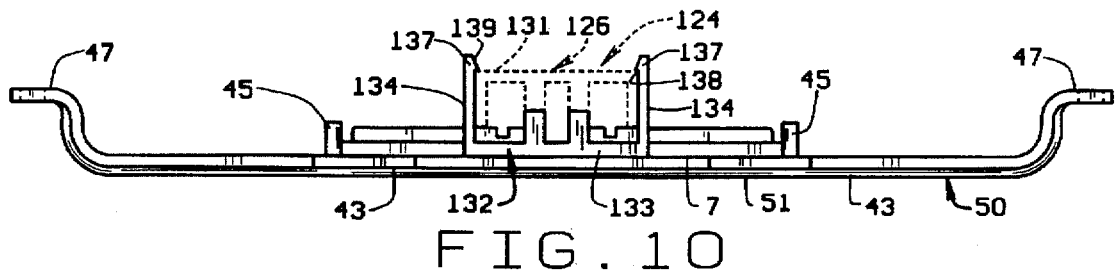
FIG. 10 is a view in front elevation of the cover of FIG. 9.

Referring now to FIGS. 8–10 for a preferred version of the first embodiment of this invention, except for the mounting means, the motor assembly of this embodiment is substantially identical to the other of the embodiments of motor assembly described in application SN(DN 5493), and is not here shown or described, except in those aspects pertinent to the present invention. The assembly has a housing 104 with a housing receptacle part 126 forming a part of a receptacle 124, shown in part in phantom lines in FIG. 10. The housing receptacle part 126 has a top wall 127 and side walls 128 and 129. The side walls 128 and 129 are essentially mirror images of one another. Their outboard surfaces 130 are planar.

In this embodiment, a cover 105 has a cover receptacle part 132 with a bottom wall 133 and side walls 134, integral along their bottom edges with side edges of the bottom wall 133 and projecting upwardly, as shown in FIG. 10. The cover receptacle part 132 projects chordally, and is also shaped complementarily to the housing receptacle part 126, to serve as a closure for that housing receptacle part and to complete the receptacle 124. In this embodiment, the side walls 134 themselves constitute latching fingers. They have, at their outer ends, facing, inwardly extending lips 137, each with a flat overhang surface 138 and above the surface 138, a camming surface 139. The cover receptacle side walls 134 are spaced to fit closely around the side walls 128 and 129 of the housing receptacle part, to permit the lips 137 to snap over flat top surface 131 of top wall 127. The surface 131 constitutes the ledges of this version.

As can be seen, when the cover receptacle part is pushed over and onto the housing receptacle part, the camming surfaces 139 flex the side walls 134 outwardly until the lips have cleared the bottom of the housing receptacle side walls and then the fingers move up the side walls until the overhang surfaces 138 of the lips clear the top of the top wall 131, when the lips snap into place. The lips are readily accessible, and can be spread apart by any suitable means sufficiently to permit the cover to be removed.

In both versions of the preferred embodiment, the cover has integral with it a mounting bracket 50. The mounting bracket 50 has a central span 51, integral with an outside surface 7 of the cover, and two arms, 53 and 54, projecting from opposite sides of the cover, the arm 53 being shown as bent and the arm 54 being shown as having a dogleg near its outer, free end. The bend and the dogleg are required to accommodate the configuration and placement of a refrigeration system bracket, for example, an evaporator motor bracket, not here shown. Both arms have yokes 47 at their free ends, adapted to receive fasteners, not here shown, by which the motor is mounted on the refrigeration bracket which is fixed in a refrigeration system. In both versions, the cover also has ears 43 extending outwardly from it, shaped complementarily to the pads or bosses on the housing. The ears have upper surfaces 44 adapted to engage a lower surface of the housing pads 24 or 124. At least one of the ears has a pin 45 integral at one end with the ear and projecting perpendicularly from the surface 44, to extend into and preferably through the passage in the pad to which the ear is complementary, to prevent the cover's cocking.

Figure 11:
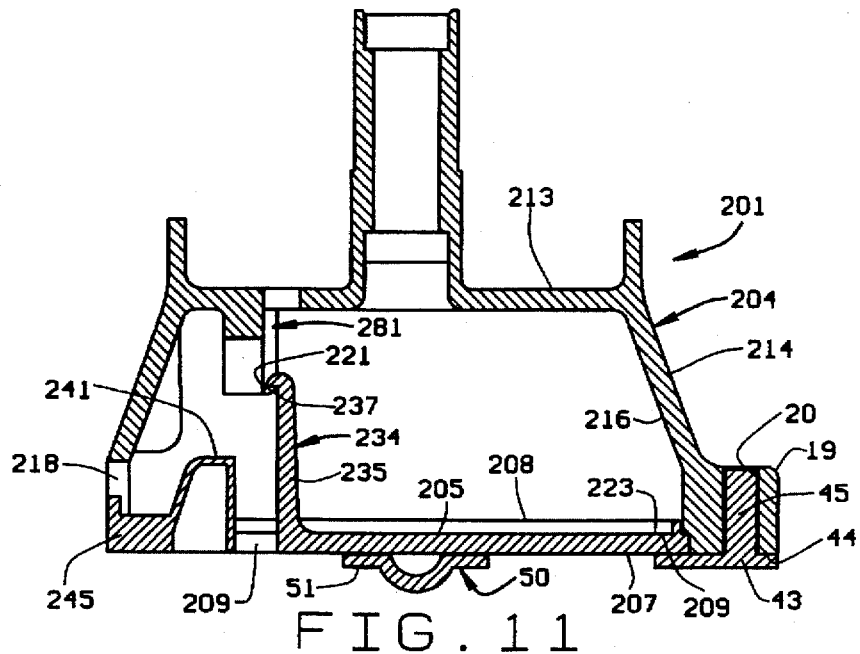
FIG. 11 is a sectional view of a housing and cover of yet another embodiment of motor assembly of this invention.
Figure 12:
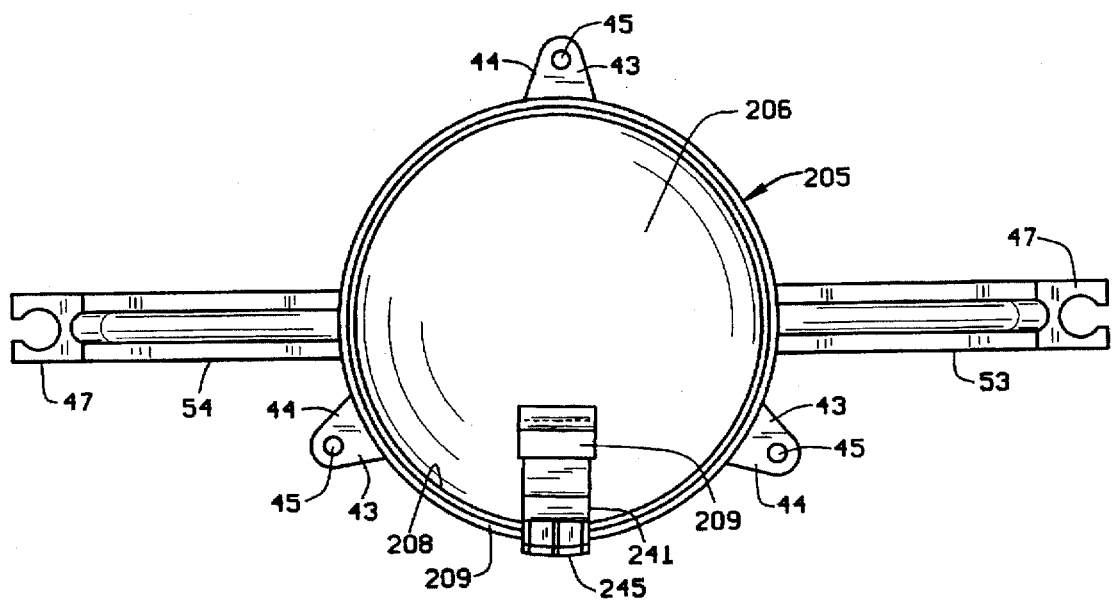
FIG. 12 is a top plan view of cover of the assembly shown in FIG. 11.
Figure 13:
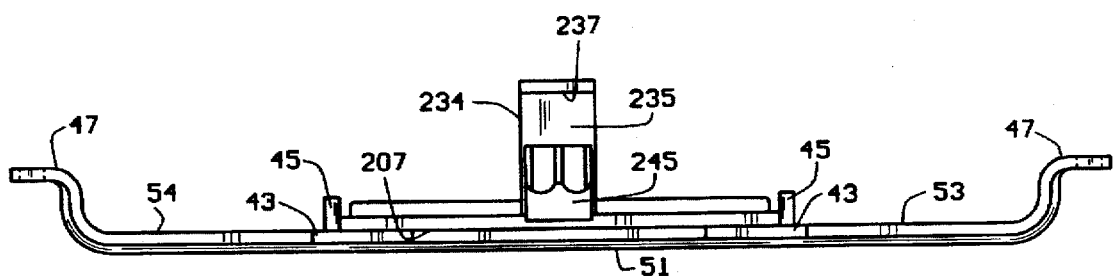
FIG. 13 is a view in front elevation of the cover shown in FIG. 12.

Referring now to FIGS. 11–13 for another illustrative embodiment of this invention, this one substantially the same, as far as construction of the motor and housing are concerned, as the condenser motor described in SN(DN 5443), a motor 201 includes a base-enclosure or housing 204 and a cover 205. Mounting pads or bosses 19, of a piece with the housing 204, are shaped and positioned to accommodate the configuration of one standard mounting bracket of a refrigerator. Like the pads 19 of the first embodiment, the pads 19 have fastener holes 20 through them. An interior space of the housing 204 is defined by a top wall 213, and a side wall 214, which has an inside surface 216 and, extending through an outer edge, a port 218. The lower outer edge of the side wall 214 is stepped inwardly to provide a seat 223.

The cover 205 has a planar inner surface 206 and a parallel planar outer surface 7. In this embodiment, the cover is substantially circular in plan, as seen in FIG. 12. The inner surface 206 has a rim 208 adjacent its outer perimeter, but offset complementarily to the stepped seat 223 of the side wall 214, to provide a foot 209 that is seated in the seat 223, while the rim engages the inner surface 216 of the side wall.

The inner surface 206 of the cover has a crenellated wall part 245, projecting chordally beyond the rim 208. The crenellated wall part is of a width to fit closely within walls defining a lower end of the port 218, and of a chordal length to remain within the confines of the side wall 214. The crenellated part 245 extends to a lower part of a strain relief block 241. The strain relief block 241 is, in this embodiment, hollow, and is provided at its radially outer side with a downwardly outwardly sloping face and a rounded upper outer edge. Spaced radially inwardly from the block 241, a finger 234 is made of a piece with the inner side surface 206 of the cover. The finger 234 has a wide, relatively thin stem 235 that is deflectable, and has at its uppermost end, a lip 237, which, when the cover is in place, engages a complementary surface of a ledge 221 of a connector boss 281. The connector boss 281 is integral with and depends from the top wall 213. The upper part of the lip 237 and the lower part of the ledge 221 are sloped complementarily. The stem 235 is stiffly deflectable, so that when the cover is installed, it can be cammed away from the under side of the ledge 221 by the engagement of the sloping surfaces of the ledge and lip until the underside of the lip clears the upper surface of the ledge, and then snaps back into place to hold the cover in position. When it is desired to remove the cover, it is only necessary to insert a screwdriver blade or the like through an opening 209 in the cover, between the strain relief block 241 and the stem 235, to deflect the stem enough to cause the lip 237 to clear the ledge 221, and the cover will be released.

Insulating sheaths of current supply conductors are caged between the upper surface of the crenellated wall and a surface defining the upper edge of the port 218, and between the radially outer wall of the strain relief block 241 and the side wall, between wings that are formed as a part of the inner surface 216 of the side wall 214, parallel with side walls of the strain relief block 241, all as shown and described in SN(DN 5443).

As in the case of the first embodiment, the cover has integral with it a mounting bracket 50. The mounting bracket 50 has a central span 51, integral with an outside surface 7 of the cover 205. The mounting bracket of this embodiment is the same as the mounting bracket of the first two embodiments described, and its parts have been given the same reference numerals. The cover 205 also has ears 43 extending outwardly from it, shaped complementarily to the pads or bosses 19 on the housing. The ears have upper surfaces 44 adapted to engage a lower surface of the housing pads 19. At least one of the ears has a pin 45 integral at one end with the ear and projecting perpendicularly from the surface 44, to extend into and preferably through the passage in the pad, to prevent the cover's cocking.

It can be appreciated that in any of the embodiments, different arrangements or sizes of mounting arms or spiders can be provided on covers of the same dimensions, so that to accommodate different refrigerator mounting bracket configurations and dimensions, it is only necessary to change the cover, not the entire housing. This gives great flexibility in the use of standard sized and shaped motors.

Numerous variations in the construction of the motors and mounting devices, within the scope of the appended claims, will occur to those skilled in the art in light of the foregoing disclosure. Merely by way of example, although a cavity must be provided to enclose the electronics to avoid grounding the motor, the cavity could be provided in the cover, and the mounting bosses carried by the cover. However, the described arrangement is preferred because it provides better structural rigidity and ease of assembly of the electronics. The mounting means on the cover will not be affected if the latching fingers are formed on the housing retainer, rather than on the cover. In that case, the cover is preferably formed with a ledge positioned above the lower surface of the cover. A hook can be provided on one of the cover and housing, diametrically opposite the receptacle or port, to provide an additional support for the cover, the cover swinging down around the hook when the fingers are released. A plurality of pins, one from each of two or more ears can be used, or, in case a hook arrangement is employed as suggested above, or some other device to ensure that the cover is securely mounted, no pin at all. The arms can take the form of spiders, spaced from the lower surface of the cover between the cover and the mounting bracket, in whole or in part within the confines of the perimeter of the lower edge of the housing, if the construction of the refrigerator mounting bracket requires it. The ears on the cover need not be coincident with the bosses on the housing, and can be provided with fastener holes by which the motor can be mounted to the bracket, if the holes in the housing bosses do not coincide with those of the bracket. If mounting ears are provided on the cover, other ears, coincident with the housing pads, can also be provided if desired. The housing can be formed of a more rigid material than the cover, in the embodiment in which the cover carries the fingers, or the cover, if the fingers are carried by the housing. The lip can be provided on only one of the fingers in the first version of the first embodiment, or one of the side walls in the second, although two are preferred. More than one finger can be provided in the second embodiment, embracing the connecting block, for example. The mounting bracket is preferably made integral with the cover, because that is a strong and simple construction. However, the cover and bracket can be made separately and secured, as by integral posts on one of the two and holes in the other, through which the posts can extend and be headed over or otherwise be secured, or the mounting bracket can be adhered to the outer face of the cover, or riveted or otherwise secured to the cover. Although the invention has particular application to the brushless permanent magnet motors described, it can be applied to other motors if they have a base to which a closure/cover is attached. These variations are merely illustrative.

Having thus described the invention, what we claim is:

1. In a motor with a base-housing, said base-housing being cup shaped and open-bottomed, said base-housing having a side wall and a top wall defining an interior space, said side wall having a port interrupting a bottom edge; an electrical circuit associated with said motor; electrical conductors electrically connected to said motor circuit, said electrical conductors extending into said interior space; current supply conductors extending through said side wall port and electrically connected to said electrical conductors, said current supply conductors being surrounded by insulating sheaths at the portion extending through said port, and a housing cover member, said cover member having an inside surface having projecting upwardly therefrom deflectable finger means with an overhanging lip, and strain relief means positioned between said finger means and said side wall port, said cover having at least one tool-receiving aperture to permit engagement of a tool with said finger means carried by an inner surface of said housing and positioned complementarily to said finger means lip to permit said lip to engage a surface of said ledge means remote from said cover inner surface to hold said cover in base-housing closing position, but to permit the deflection of said finger means by a tool inserted through said cover aperture to move said lip from off said ledge, hence to release said cover, the improvement comprising motor mounting means integral with said cover, said motor mounting means being releasable from said base-housing, with said cover so as to permit the interchange of said cover and motor mounting means and said base-housing to permit variation in the configuration and size of said motor mounting means merely by interchanging a selected cover and its associated integral motor mounting means while retaining the other structural components of said motor.

2. The improvement of claim 1 wherein said finger means and strain relief means are of a piece with said cover.

3. The motor of claim 1 wherein said motor mounting means project beyond the perimeter of said housing.

4. The motor of claim 1 wherein the housing side wall is generally circular in plan and has an inner annular step at its open end to form a seat for said base member cover members.

5. The motor of claim 4 wherein said cover member has an upstanding perimetric rim complementarily offset radially inwardly to fit within the ambit of said base member side wall, with a foot part in said seat.

6. In a motor assembly for mounting on a mounting bracket of substantially fixed configuration and dimensions, said motor assembly having a housing, the improvement comprising a cover selectively mountable on and demountable from said housing and serving as a closure for said housing, and mounting means carried by said cover, said mounting means being complementary to said mounting bracket for mounting said motor assembly on said mounting bracket, said mounting means being demountable with said cover so as to permit various configurations and sizes of said mounting means to be associated with said motor merely by interchanging a selected cover and its associated mounting means.

7. In a refrigerator motor with a hollow base-housing with an open mouth defined by a side wall, and a cover for said mouth, the improvement comprising fastener means including deflectable finger means, one end of which is integral with one of said cover and base-housing and a free end of which is provided with lip means, complementary ledge means integral with the other of said base-housing and cover, spaced and shaped to receive and be engaged by said lip means, and a motor mounting system for mounting said motor in an application associated with said cover, said motor mounting system being removable from said motor with said cover so as to permit interchange of one cover and motor mounting system with another motor cover and second mounting system to thereby accomplish variations of configuration and size of the motor mounting system.

8. The improvement of claim 7 wherein said finger means are sufficiently deflectable to permit said lip means to snap over said ledge means to hold the cover in place.

9. The improvement of claim 7 wherein said finger means are part of said cover.

10. The improvement of claim 9 wherein said housing has a side wall and a receptacle part projecting from said side wall, said ledge means being in said housing receptacle part, and said cover has a cover receptacle part of a piece with said cover, said finger means being integral with said cover receptacle part.

11. The improvement of claim 7 wherein said motor housing has integral with it outwardly extending mounting bosses with passages through them parallel to the axis of rotation of said motor, and the cover has ears integral with the cover and arranged complementarily to said mounting bosses, and a pin integral with and projecting from at least one of said ears and extending through said passage in a corresponding mounting boss when the cover is in place.

12. In a motor with a hollow base-housing with an open mouth defined by a side wall, the open mouth generally being circular in plan view, and a complementary generally circular cover-closure for said mouth, an electrical motor circuit and power conductors electrically connected to said circuit at one end and adapted to be connected to a source of power at another end, the improvement comprising a housing power conductor receptacle part projecting chordally outboardly of said side walls, said receptacle part having side walls having open ended finger-receiving channels formed in them, an upper edge of each of said channels defining a ledge, said housing power conductor receptacle part being open along its bottom and chordally outer side, and said cover having a cover receptacle part, said cover receptacle part having a chordally extending bottom wall of a size and shape to cover said housing power conductor receptacle part open bottom, and latching fingers attached to said cover receptacle part at one end, said fingers having a shape, size and position to extend into said finger-receiving channels, and having oppositely disposed, outboardly directed lips at the free ends of said fingers which engage said ledges and hold said cover in place; and a motor mounting system integral with said cover and projecting beyond the circular bottom edge of said base-housing for attaching the motor in an intended application, said motor mounting system being removable from said base-housing with said cover so as to permit variations of configuration and sizes for said motor mounting system merely by interchanging respective ones of said cover and the cover's associated motor mounting system.

13. In a motor with a hollow base-housing, said base-housing having a side wall and a receptacle part projecting from said side wall, said base-housing having an open mouth defined by said side wall, and a cover for said mouth, said cover having a cover receptacle part forming a portion of said cover, said housing being generally circular in bottom plan and said housing receptacle part and said cover receptacle part being generally rectangular in plan, said housing receptacle part having two sides extending chordally from said housing, said housing receptacle part side walls having inwardly opening channels in them, said channels being open ended, ending short of a top wall and defining edges at an upper end thereof, the improvement comprising fastener means including deflectable finger means, one end of which is integral with one of said cover and a free end of which is provided with lip means, said finger means extending from opposite sides of said cover receptacle part with said lips projecting outwardly in opposite directions, a complementary ledge means integral with said base-housing, spaced and shaped to receive and to be engaged by said lip means, and a motor mounting system for mounting said motor in an application associated with said motor, said motor mounting system being removable from said base-housing with said cover.

14. In a motor with a hollow base-housing with an open mouth defined by a side wall, a receptacle part projecting from said side wall, and a cover having a cover receptacle part associated with it for covering said mouth and said receptacle part, the improvement comprising fastener means including two deflectable finger means, said finger means being integral with said cover receptacle part, said finger means having a free end provided with lip means, complementary ledge means integral with said base-housing, said finger means being spaced apart transversely of said receptacle, with said lips facing one another, said receptacle part having a flat side surface accommodating said finger means, and a top wall ledge to receive the lips of said finger means, and a motor mounting system for mounting said motor in an application, said motor mounting system being associated with said cover and being integral with said cover.

15. The improvement of claim 9 wherein said housing has a side wall and a receptacle part projecting from said side wall, said cover having a cover receptacle part associated with it, said finger means being integral with said cover receptacle part, said finger means being spaced apart transversely of said receptacle, with lips facing one another, said housing receptacle part having flat side surfaces to accommodate said fingers, and a top wall ledge to receive lips of said finger means.

* * * * *

UNITED STATES PATENT AND TRADEMARK OFFICE
CERTIFICATE OF CORRECTION

PATENT NO. : 5,696,416

DATED : December 9, 1997

INVENTOR(S) : Gerald N. Baker et al.

It is certified that error appears in the above-identified patent and that said Letters Patent is hereby corrected as shown below:

Column 7, Line 54, after "means" please insert therefor -- , and ledge means --;

Signed and Sealed this

Tenth Day of March, 1998

Attest:

BRUCE LEHMAN

*Attesting Officer*     *Commissioner of Patents and Trademarks*